No. 745,221. PATENTED NOV. 24, 1903.
J. N. MILLER.
WEEDLESS FISH HOOK.
APPLICATION FILED SEPT. 21, 1903.
NO MODEL. 2 SHEETS—SHEET 1.

Witnesses:
Chas. E. Gorton
A. Gustafson

Inventor:
Joseph N. Miller
By Chas. A. Tillman Atty.

No. 745,221. PATENTED NOV. 24, 1903.
J. N. MILLER.
WEEDLESS FISH HOOK.
APPLICATION FILED SEPT. 21, 1903.
NO MODEL. 2 SHEETS—SHEET 2.
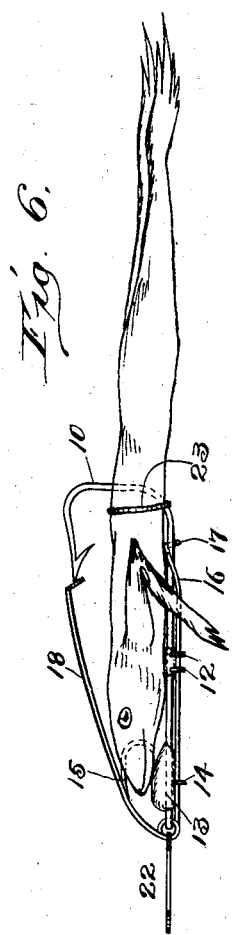
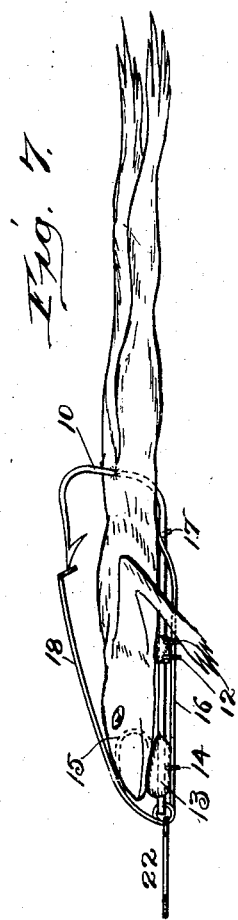

No. 745,221. Patented November 24, 1903.

UNITED STATES PATENT OFFICE.

JOSEPH N. MILLER, OF McHENRY, ILLINOIS.

WEEDLESS FISH-HOOK.

SPECIFICATION forming part of Letters Patent No. 745,221, dated November 24, 1903.

Application filed September 21, 1903. Serial No. 173,936. (No model.)

*To all whom it may concern:*

Be it known that I, JOSEPH N. MILLER, a citizen of the United States, residing at McHenry, in the county of McHenry and State of Illinois, have invented certain new and useful Improvements in Weedless Fish-Hooks, of which the following is a specification.

This invention relates to improvements in that class of fish-hooks known as the "weedless" hooks; and it consists in certain peculiarities of the construction, novel arrangement, and operation of the various parts thereof, as will be hereinafter more fully set forth and specifically claimed.

The principal object of the invention is to provide a fish-hook which shall be simple and inexpensive in construction, strong, durable, and effective in operation, and so made that it will be absolutely weedless or the point of the hook will be so protected or guarded that it may be drawn through lily-pads, reeds, rushes, or the limbs of sunken trees without engaging therewith.

Another and important object of the invention is to so construct and arrange the parts of the hook that when a fish strikes or bites at the bait the hook will be given a whirl, so as to hook the fish in the lower jaw or lip, which is more easily pierced than the upper jaw or lip, and thus renders the act of catching or landing the fish more certain.

Another object of the invention is to so construct the hook and its parts that the bait, such as a frog or minnow, may be fastened thereon in a variety of ways.

A still further object is to provide means for keeping the belly of the frog when used for bait downward and also for more securely retaining it in position on the hook.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1:
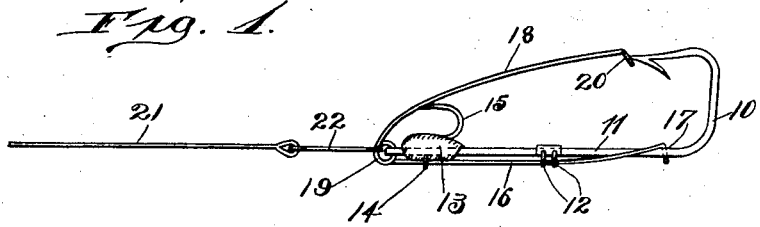
Figure 2:
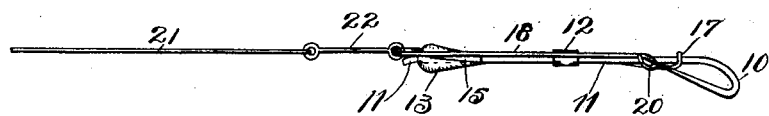
Figure 3:
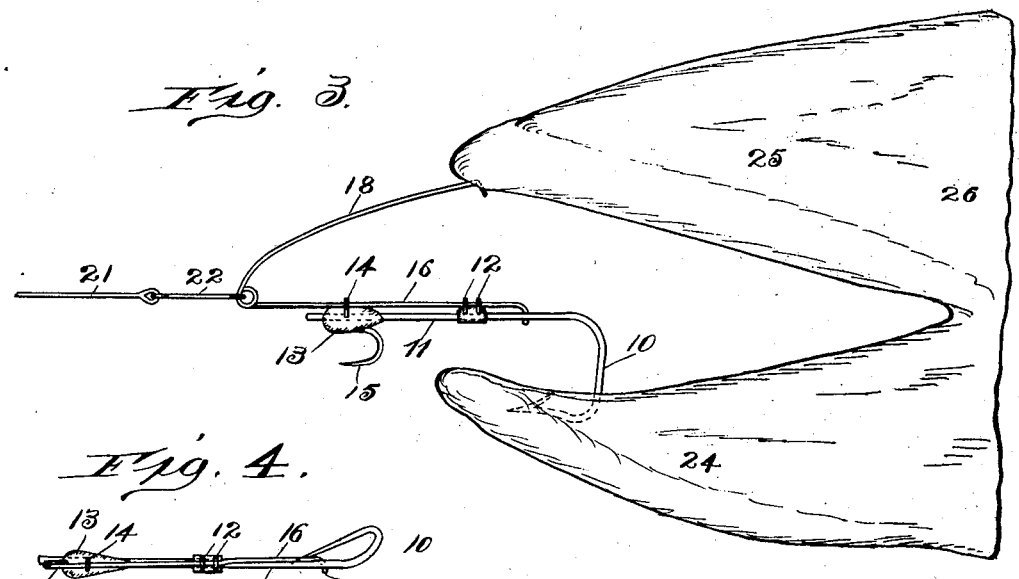
Figure 4:
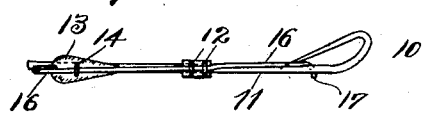

Figure 1 is a view in side elevation of a hook embodying my invention, showing the weed-guard in position to protect the point of the hook. Fig. 2 is a plan view of the hook. Fig. 3 is an enlarged view in elevation of a portion of the head of a fish, illustrating the position and action of the hook after the fish has bitten or struck at the bait. Fig. 4 is a bottom plan view of the hook. Fig. 5 is a view in side elevation, showing one manner of fixing the bait on the hook. Fig. 6 is a similar view showing another way of attaching the bait to the hook, and Fig. 7 is a similar view showing still another modified way of attaching the bait to the hook.

Like numerals of reference refer to corresponding parts throughout the different views of the drawings.

The reference-numeral 10 represents a fish-hook, which may be of any suitable size, form, and construction, but preferably of the form shown in the drawings—that is, with the point and barb bent out of alinement with the stem—as will be readily understood by reference to Figs. 2 and 4 of the drawings. The stem 11 of the hook has fixed thereon about its middle one or more guides 12, which are located on the opposite surface of the stem 11 from that on which the main bend of the hook appears. Near its free end the stem 11 has fixed thereon a weight 13 of any suitable size and form, but preferably substantially pear-shaped, as shown. This weight is provided with a guide 14 in alinement with the guides 12, which guides are for the reception and operation of the torsion-spring member of the guard. The weight 13 is provided on its surface opposite the guide 14 thereon with an auxiliary hook 15, the purpose of which will be presently explained.

The weed-guard or protector for the point of the hook 10 comprises a torsion-spring member 16, which is located in the guides 12 and 14 and has at its free end a hook or loop 17 to engage the stem 11 of the main hook and an arm 18, bent to form a spiral spring 19 at its juncture with the member 16, as is clearly shown in the different views of the drawings. The free end of the arm 18 is provided with an eye or loop 20 to receive the point of the hook 10, which loop or eye is slightly deflected from the arm, so that the point of the hook 10 may be released by a slight inward pressure of said arm. A line 21, attached at one of its ends to the reel or fishing-rod, may be connected to the spring-coil 19 of the weed-guard by means of a link 22 or otherwise.

In Fig. 5 of the drawings I have shown a frog (to be used for bait) attached to the hook 10 by passing the same through the lower and upper lips, as shown, so that its body will trail behind the hook.

In Fig. 6 I have shown the hook used as a "tandem" hook, which expression is well known to bait-casting fishermen—that is, the supplementary or auxiliary hook 15 is passed through the lips of the frog, while its body just above the thighs is secured to the hook 10 by means of an elastic band 23 or any other suitable securing device.

In the Fig. 7 of the drawings is shown another manner of securing the frog in position on the hook and using the hook as a tandem one which consists in passing the auxiliary hook 15 through the lips of the frog and the hook 10 through its body at the juncture of its legs. It will be observed that by hooking the frog and employing the hook as a tandem, as illustrated in Figs. 6 and 7, the guard-arm 18 will prevent the frog accidently slipping off the auxiliary hook.

From the foregoing and by reference to the drawings it will be seen and clearly understood that by using a hook constructed according to my invention and above set forth and illustrated when the fish strikes at or bites the bait, which may be attached to the hook in any of the ways shown or otherwise, the guard-arm 18 will be released from the barbed point of the hook 10 by the pressure of the jaws of the fish, at which time the spring guard-arm 18 and the torsion-spring 16 will be moved by pulling on the line 21 toward the free end of the stem 11, which operation by reason of the torsion of the spring 16 will cause the hook 10 to whirl on its axis, so as to hook the fish in the lower jaw 24, as shown in Fig. 3 of the drawings, the upper jaw 25 of the fish's head 26 serving to stop the movement of the arm 18 or weed-guard.

Having thus fully described my invention, what I claim as new, and desire to secure by Letters Patent, is—

1. As an improved article of manufacture, a weedless fish-hook comprising a hook carrying on its stem a series of guides, and a spring-guard consisting of a torsion member loosely engaging at one of its ends the stem of the hook and located in said guides, and a member connected to the torsion member by a coil to form a spring-arm and having at its other end a loop or eye to receive the point of the hook, substantially as described.

2. As an improved article of manufacture, a weedless fish-hook comprising a hook carrying on its stem a series of guides, an auxiliary hook secured to the stem near its free end, and a torsion-spring member located in said guides and secured in movable engagement with said stem and a guard-arm having at its free end an eye and connected at its other end to the torsion member by means of a coil-spring, substantially as described.

3. As an improved article of manufacture, a weedless fish-hook comprising a hook carrying on its stem a series of guides, a weight located on the stem near its free end, an auxiliary hook connected to the stem near its free end, a torsion member located in the said guides and loosely engaging at one of its ends the stem of the main hook, and a guard-arm having at its free end an eye and connected at its other end to the torsion member by means of a spring, substantially as described.

JOSEPH N. MILLER.

Witnesses:
CHAS. C. TILLMAN,
A. GUSTAFSON.